US011857501B2

(12) United States Patent
Zijlstra et al.

(10) Patent No.: US 11,857,501 B2
(45) Date of Patent: Jan. 2, 2024

(54) BABY BOTTLE DEVICE

(71) Applicant: KONINKLIJKE PHILIPS N.V., Eindhoven (NL)

(72) Inventors: Aaldert Geert Zijlstra, Zuidlaren (NL); Gertrude Riëtte Bakker-Van Der Kamp, Den Helder (NL); Luc Berntsen, Eindhoven (NL); Klaas Kooijker, Drachten (NL); Johannes Tseard Van Der Kooi, Munein (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 189 days.

(21) Appl. No.: 17/297,478

(22) PCT Filed: Jan. 2, 2020

(86) PCT No.: PCT/EP2020/050004
§ 371 (c)(1),
(2) Date: May 27, 2021

(87) PCT Pub. No.: WO2020/141186
PCT Pub. Date: Jul. 9, 2020

(65) Prior Publication Data

US 2022/0031572 A1 Feb. 3, 2022

(30) Foreign Application Priority Data

Jan. 2, 2019 (EP) .................................... 19150033

(51) Int. Cl.
*A61J 11/02* (2006.01)
*A61J 9/04* (2006.01)
*A61J 11/04* (2006.01)

(52) U.S. Cl.
CPC ................. *A61J 11/02* (2013.01); *A61J 9/04* (2013.01); *A61J 11/04* (2013.01)

(58) Field of Classification Search
CPC ............... A61J 11/02; A61J 9/04; A61J 11/04
(Continued)

(56) References Cited

U.S. PATENT DOCUMENTS 5,747,083 A 5/1998 Raymond
2012/0037587 A1 2/2012 Tirosh
2018/0168936 A1* 6/2018 Stanislawczyk ....... A61J 11/002

FOREIGN PATENT DOCUMENTS

CN 201164602 Y 12/2008
CN 103202770 A 7/2013
(Continued)

OTHER PUBLICATIONS

International Search Report and Written Opinion dated Feb. 21, 2020 for International Application No. PCT/EP2020/050004 Filed Jan. 2, 2020.

*Primary Examiner* — Valentin Neacsu
*Assistant Examiner* — Jessica Kavini Tamil

(57) ABSTRACT

A baby bottle device (100) is provided which comprises a container (110) with a container volume (115), a teat (120) with a teat volume (125) and a valve unit (200). The teat comprises a first valve (112) for inletting air into the inside volume of the bottle (100). The inside volume of the bottle corresponds to the volume of the container (110) and the teat volume (125). The valve unit (200) with a second valve (210 230) is arranged outside the teat volume (125). The threshold of the vent unit is lower than the threshold of the first vent (112) in the teat.

19 Claims, 4 Drawing Sheets

(58) Field of Classification Search
USPC .......................................................... 215/11.5
See application file for complete search history.

(56) References Cited

FOREIGN PATENT DOCUMENTS

| | | | | | |
|---|---|---|---|---|---|
| DE | 19716535 | A1 | | 11/1997 | |
| DE | 29906849 | U1 | | 7/1999 | |
| DE | 19849271 | A1 | | 4/2000 | |
| EP | 1354579 | A1 | | 10/2003 | |
| FR | 1364632 | A | | 6/1964 | |
| GB | 2413087 | A | * | 10/2005 | .............. A61J 11/02 |
| WO | WO-2005112869 | A1 | * | 12/2005 | .............. A61J 11/02 |
| WO | 2006/103379 | A1 | | 10/2006 | |
| WO | 2018/162366 | A1 | | 9/2018 | |

* cited by examiner

BABY BOTTLE DEVICE

CROSS REFERENCE TO RELATED APPLICATIONS

This application is the U.S. National Phase application under 35 U.S.C. § 371 of International Application No. PCT/EP2020/050004 filed Jan. 2, 2020, which claims the benefit of European Patent Application Number 1915033.9 filed Jan. 2, 2019. These applications are hereby incorporated by reference herein.

FIELD OF THE INVENTION

The invention relates to a baby bottle device and a method of producing a baby bottle.

BACKGROUND OF THE INVENTION

During the baby feeding with a bottle, the baby may swallow air together with the milk from the bottle. This can result in colic. A colic is a condition some infants suffer from during early months and is caused by air in the digestive system. Air ingestion is unavoidable both in breast feeding and bottle feeding due to the presence of vacuum in the infant's mouth during feeding. It is, however, desired to reduce the amount of air ingestion by the infant to reduce the risk of a colic.

WO 2018/162366 discloses a baby feeding bottle with a container, an adapter and a teat. Furthermore, a partitioning may be provided between the teat volume and the volume of the container. The partition allows fluid to flow from the container into the teat and that air inside the teat volume can escape into the container volume in order to reduce the amount of air in the teat volume.

U.S. Pat. No. 5,747,083 discloses a feeding bottle in which a flexible capsule or bag contains the milk. A space outside the flexible capsule or bag is vented by a valve unit, allowing it to collapse. Thus, there is no need for any air to enter the milk container volume. However, this is a more complicated structure with many parts.

SUMMARY OF THE INVENTION

It is an object of the invention to provide a baby bottle device with an improved colic prevention capability. It is in particular an object of the invention to provide a baby bottle device which can efficiently prevent air flowing into a teat volume.

The invention is defined by the claims.

According to an embodiment, a baby bottle device is provided which comprises a container with a container volume, a teat with a teat volume and a valve unit. The teat comprises a first valve for inletting air into the inside volume of the bottle, in particular into the teat. The inside volume of the bottle corresponds to the volume of the container and the teat volume. The valve unit with a second valve is arranged outside the teat volume. The threshold of the valve unit is lower than the threshold of the first vent in the teat.

Accordingly, the valve unit outside the teat volume will first be activated or let in air before the valve in the teat will let in air. This is advantageous as the air inlet will occur at a position which is not inside the teat volume. This in turn is advantageous as an air inlet into the milk inside the teat volume can be avoided. Thus, the possibilities of colics in a baby will be significantly reduced.

According to another embodiment, there is a baby bottle device comprising a container having a container volume to contain milk and a teat for attachment to the container and having a teat volume. The baby bottle device further comprises a valve unit arranged outside the teat volume for allowing air to flow into the container volume without coming into contact with milk inside the teat volume.

The teat does not need its own valve. Thus, only one valve is used, which allows air to enter the space in the container volume outside the teat volume.

According to another embodiment, there is a teat coupling device for a baby bottle device, the baby bottle device comprising a container having a container volume to contain milk and a teat for attachment to the container and having a teat volume. The teat coupling device comprises a valve unit for arranging outside the teat volume for allowing air to flow into the container volume without coming into contact with milk inside the teat volume.

A teat device (assembly) comprises the teat coupling device and the teat.

This provides a teat coupling device for the baby bottle device of the invention. The teat coupling device incorporates a valve unit. The teat itself may have at least one first valve for allowing air to flow from the outside of the teat into the teat volume, and the valve unit then comprises a second valve, which has a lower cracking pressure than the first valve.

In all of these embodiments, the device may comprise an adapter for coupling the teat and the container. This adapter may be considered to be part of the teat coupling device. The valve unit can be arranged in the region of the adapter.

According to an embodiment of the invention, a partitioning element can be provided between the teat volume and the container volume. This partitioning element may be considered to be part of the teat coupling device.

According to an embodiment, the valve unit can be part of the partitioning element. Thus, only one piece needs to be manufactured.

In particular, such a valve can be embodied as a duckbill valve in the partitioning module.

According to a further embodiment, the valve of the valve unit can be attached at one end to the partitioning module and the other end can be pressed against the container or the adapter. Such an implementation can be advantageous in view of dimensional tolerances.

According to an embodiment, a baby bottle comprising a container, a teat, optionally an adapter and optionally a separator is provided. The separator can be implemented as a portioning element and is placed between the teat and the container. An air valve is integrated in the separator enabling an air flow into the bottle outside of the volume of the teat. The teat comprises a further valve. The valve in the separator can be implemented as a flexible sheet of material that when mounted in the bottle is in contact with a solid surface, namely a wall of the container. The valve is part of the partitioning element. Hydrostatic pressure can press the flexible sheet of the valve unit against the surface of the wall of the container thus preventing leakage towards the outside of the bottle. When the bottle is in use and the baby is sucking, the air pressure difference with the outside atmosphere pushes the flexible sheet of material aside creating a channel for the inflow of air.

According to an aspect of the invention, a method of producing a baby bottle device is provided. A teat having a teat volume and at least a first valve is provided. A container having a container volume is also provided as well as a valve unit arranged outside the teat volume. The valve unit has a second valve which has a lower cracking pressure than the first valve.

It shall be understood that a preferred embodiment of the present invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Figure 1:
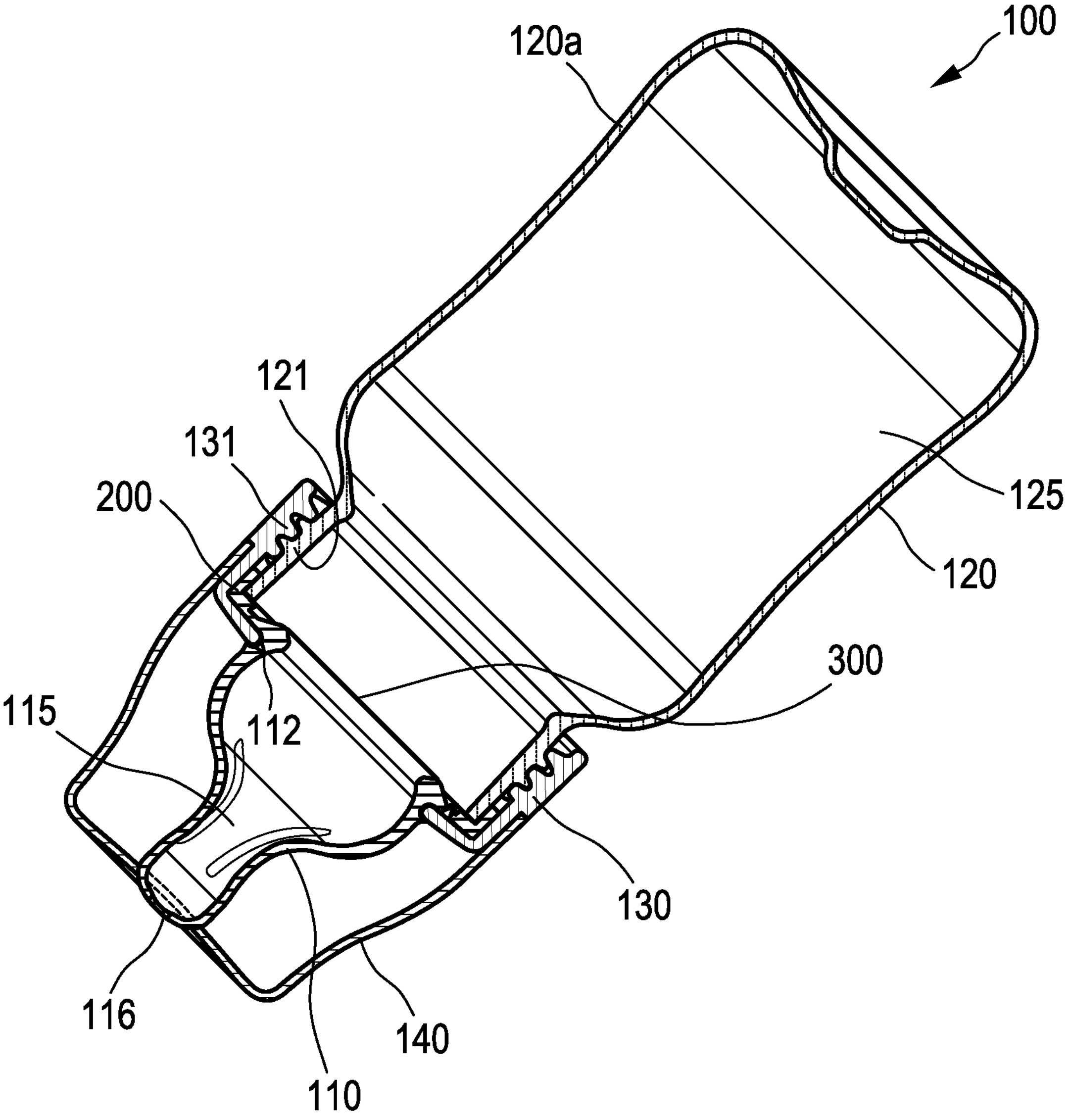
FIG. 1 discloses a schematic representation of a baby bottle device.

FIG. 1 discloses a schematic representation of a baby bottle device. The baby bottle 100 comprises a container 120 with a container wall 120*a*, a teat 110 and optionally an adapter 130 for example in form of an attachment ring to attach the teat 110 to the container 120. The container 120 comprises a thread 121 which can interact with a thread 131 of the adapter 130 such that the teat 110 can be fastened to the container 120. The container 120 comprises a container volume 125 and the teat 110 comprises a teat volume 115. The teat 110 comprises at least one valve 112 and holes/apertures 116.

The valve 112 is defined in the vicinity of a lip of the opening to the container volume. It allows air to flow from the outside of the teat into the teat volume. There is for example an air passage past a gap between the lip of the container opening and the teat, and then to the valve 112 (this can be seen in FIG. 2A). Thus, as milk is removed from the container, a resulting negative pressure in the air space behind the milk creates a pressure across the valve 112 and allows air to fill the container volume, via the teat, to replenish the volume vacated by the milk. The pressure is again equalized. The valve 112 is for example a flap valve. The valve 112 has a first cracking pressure (i.e. a differential pressure across the valve) at which the air is able to flow. The valve 112 is a one way valve, only allowing air to flow into the teat volume.

Note that the first valve 112 is a conventional known valve for allowing venting of the container through the teat. It is part of the design of the teat.

Optionally, a partitioning element 300 can be provided between the teat 110 and the container 120. Furthermore, a valve unit 200 is provided outside the teat volume 115. The valve unit 200 can in particular be provided in the region of the adapter 130 if an adapter is present. The valve unit 200 can be provided between the partitioning element 300 and the wall 120*a* of the container 120. Accordingly, the valve function is moved away from the teat volume 115.

A (second) cracking pressure of the valve unit 200 is lower than the (first) cracking pressure of the valve 112 of the teat 110. Accordingly, the valve unit 200 will allow air to enter into the bottle at a lower pressure than the valve 112 of the teat 110.

The valve unit 200 can be part of the partitioning element 300. They can be provided as one piece.

According to an embodiment, the valve unit 200 can be provided between an open end of the container 120 and the adapter 130 or between the container wall 120*a* and the partitioning element 300.

Figure 2A:
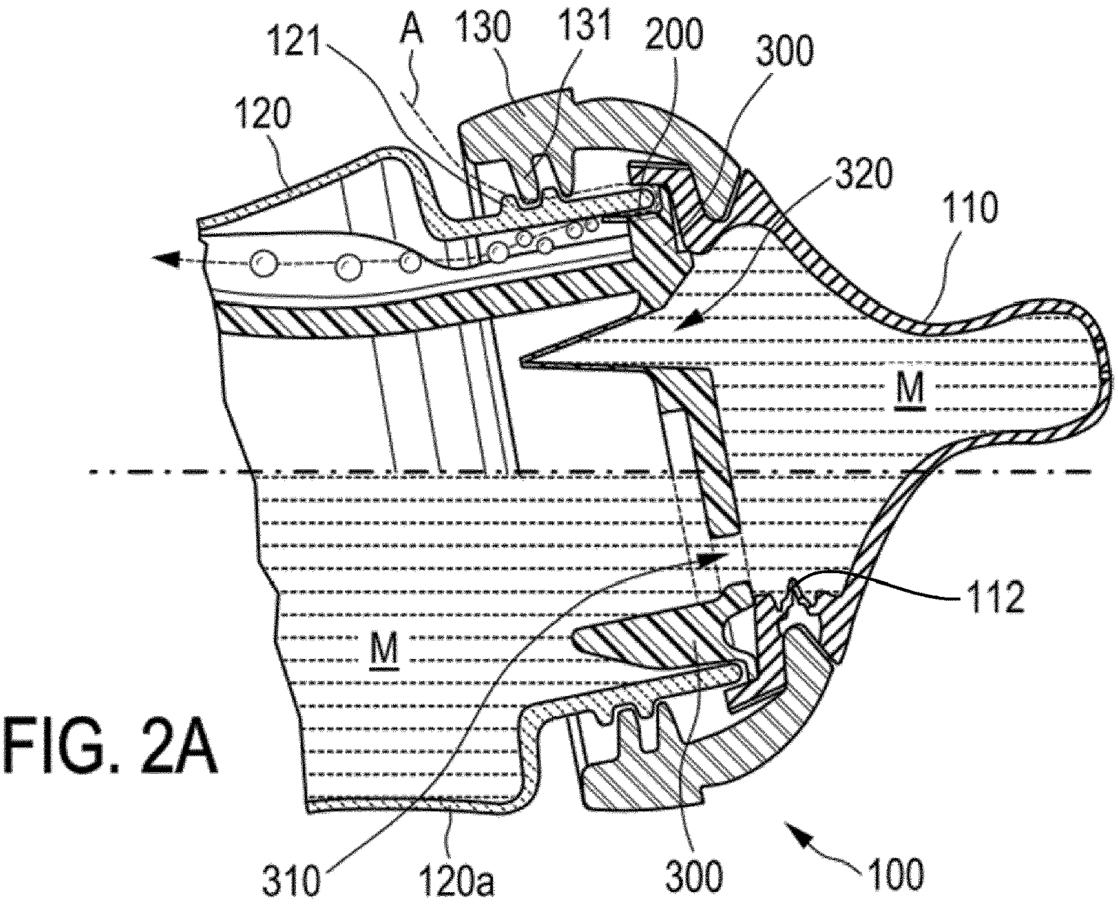
FIG. 2A shows a further schematic cross section of a baby bottle device according to an embodiment.

According to an embodiment, the valve unit 200 can be provided at the partitioning module 300 and can bear against the wall 120*a* of the container as shown in FIG. 2A.

Figure 2B:
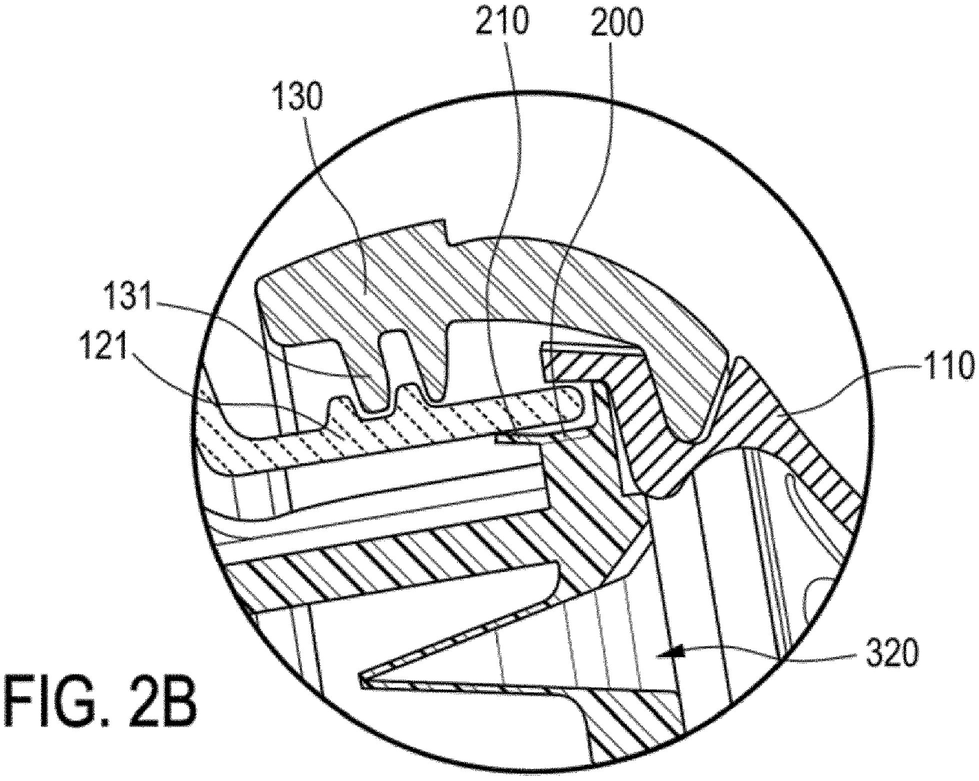
FIG. 2B shows an enlarged portion of the baby bottle according to FIG. 2A.

FIG. 2A shows a further schematic cross section of a baby bottle device according to an embodiment. FIG. 2B shows an enlarged portion of the baby bottle according to FIG. 2A. The bottle 100 comprises a container 120 with a wall 120*a*, a teat 110 and optionally an adapter 130. A partitioning element 300 is provided between a volume 125 of the container and a volume 115 of the teat 110. The partitioning element 300 comprises several openings 310, 320. A valve unit 200 is provided e.g. at the circumference of the partitioning unit 300 and bears against a wall 120*a* of the container 120. The valve unit 200 allows outside air A to flow into the container volume 125 without coming into contact with the milk M inside the teat 110. The valve unit 200 is attached to the partitioning element 300 and can have a flexible material (like rubber, silicone rubber) such that a flexible arm 210 is pressed against the inside of the container wall 120*a*. The arm 210 and the portioning element 300 can be manufactured by a 2K (two component) manufacturing, e.g. as one piece.

Figure 3A:
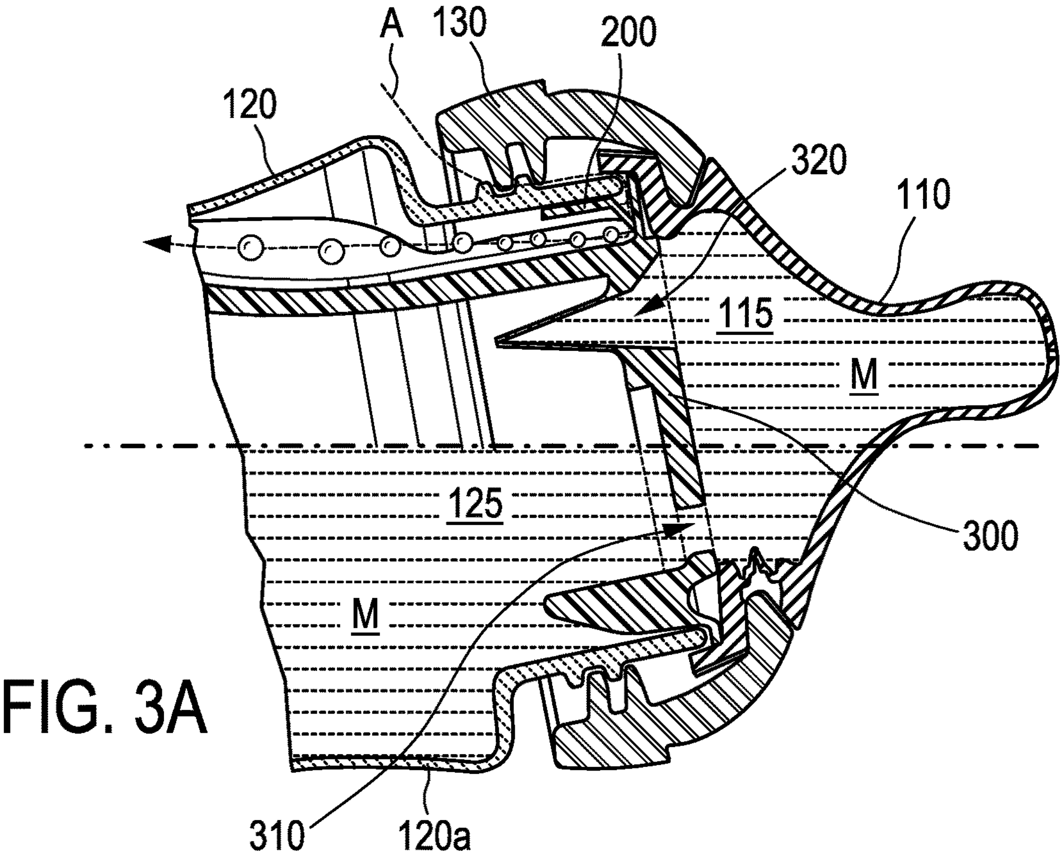
FIG. 3A shows a further schematic cross section of a baby bottle device according to an embodiment.
Figure 3B:
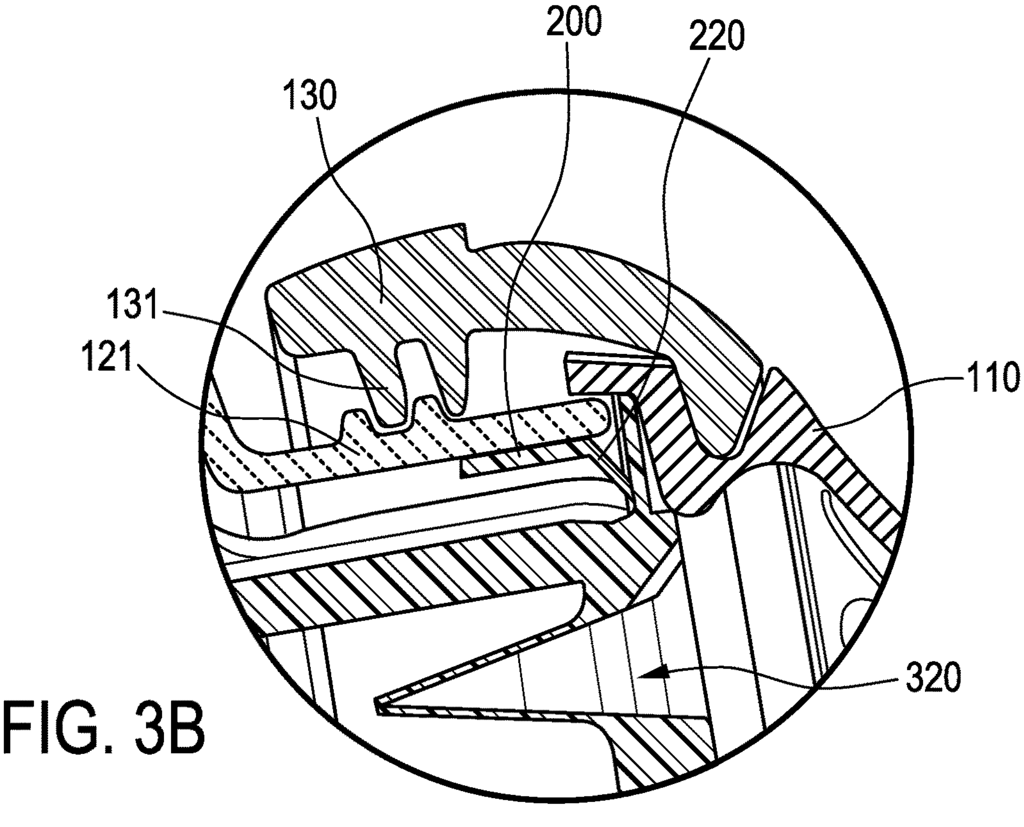
FIG. 3B shows an enlarged portion of the baby bottle according to FIG. 3A.

FIG. 3A shows a further schematic cross section of a baby bottle device according to an embodiment. FIG. 3B shows an enlarged portion of the baby bottle 100 according to FIG. 3A. The structure of the bottle as shown in FIG. 3A substantially corresponds to the structure of the bottle according to FIG. 2A. A valve unit 200 is provided at the partitioning element 300 and interacts with the container wall 120*a*. Accordingly, an arm 220 of the valve 200 may press against the inside of the container wall. This can be beneficial in view of dimensional tolerances.

Figure 4A:
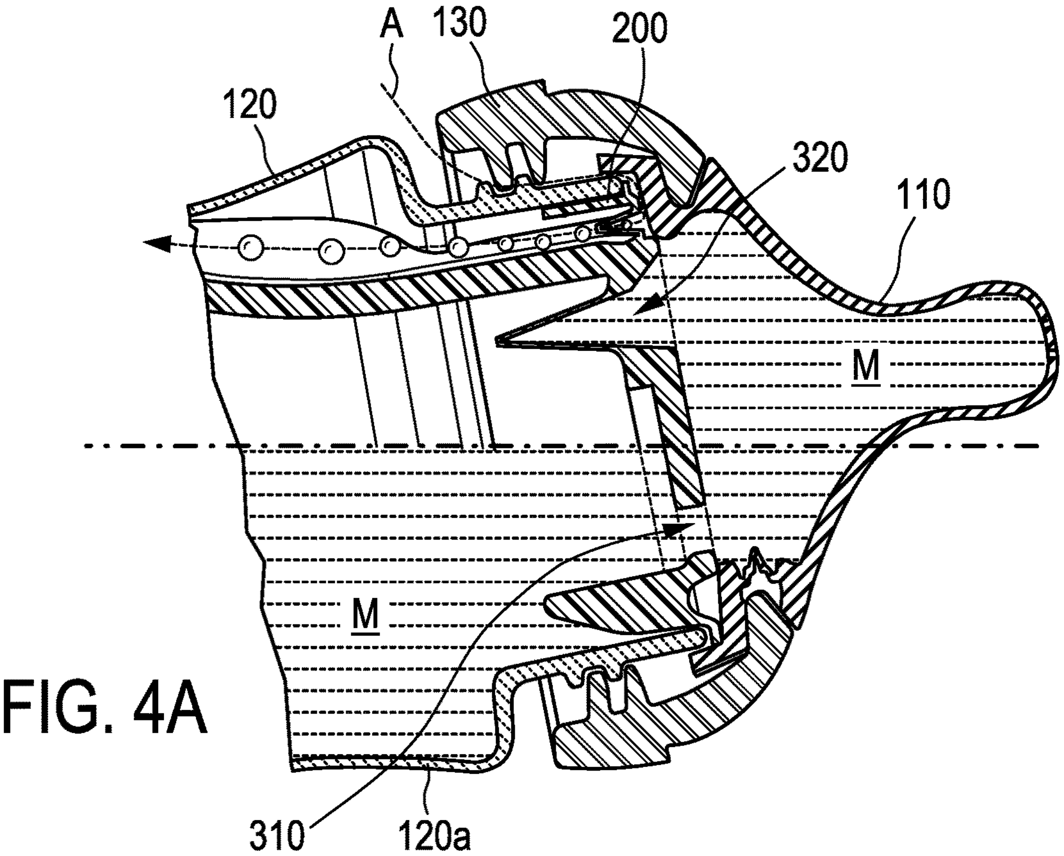
FIG. 4A shows a further schematic cross section of a baby bottle device according to an embodiment.
Figure 4B:
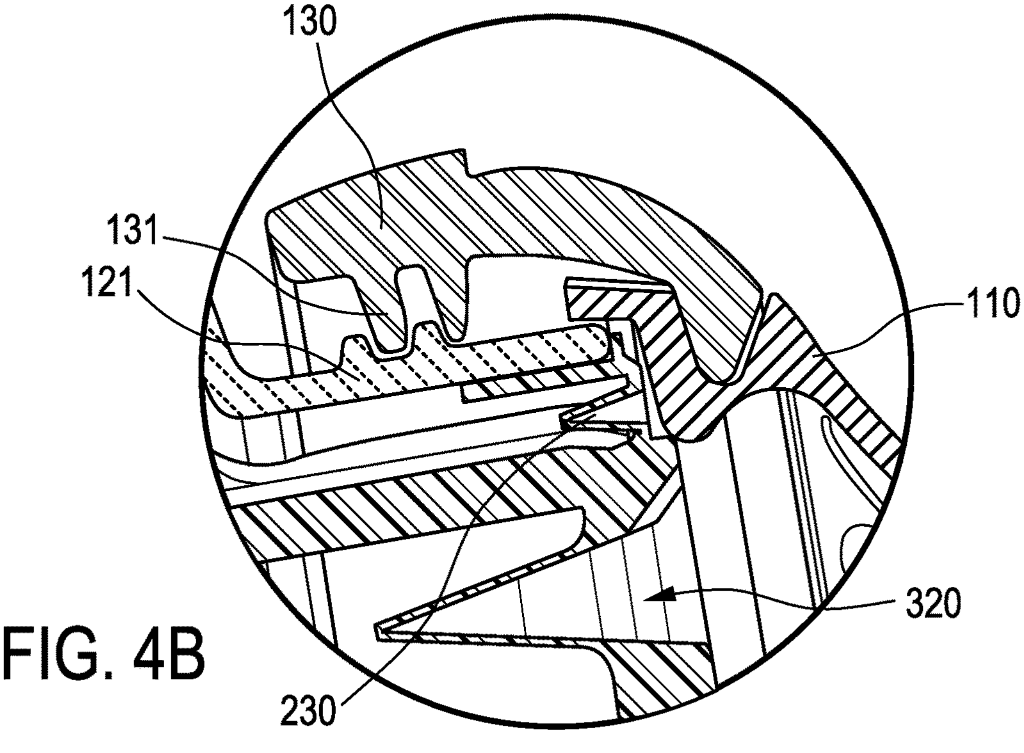
FIG. 4B shows an enlarged portion of the baby bottle according to FIG. 4A.

FIG. 4A shows a further schematic cross section of a baby bottle device according to an embodiment. FIG. 4B shows an enlarged portion of the baby bottle according to FIG. 4A. The bottle according to FIG. 4A corresponds to the bottle according to FIG. 2A or 3A with the exception of the partitioning unit 300 and the valve unit 200. The valve unit 200 can comprise a duckbill valve 230 and is part of the partitioning element 300.

With the baby bottle device according to FIG. 2A, 3A or 4A, it is effectively possible to avoid that outside air coming through a vent is travelling through the milk before it can reach the inner volume of the container. Thus, the amount of air in the milk can be significantly reduced which is advantageous in view of a colic prevention.

The cracking pressure of the valve unit 200 (the second cracking pressure) is lower than the cracking pressure of the valve 112 (the first cracking pressure) in the teat. Thus, it can effectively be avoided that air is entering through the teat volume such that the amount of air inside the milk is increased.

The valve unit 200 can be implemented as a flexible sheet of material which interacts with the wall 1200 of the container 120 and is attached to the partitioning element 300. As an example, a flexible arm may be pressed against an inside of the wall of the bottle.

In the embodiment of FIGS. 2A and 3A, the valve unit 200 is arranged between the partitioning element 300 and a wall of the container.

The valve unit 200 according to FIGS. 4A and 4B is implemented as a duckbill valve which is not in contact with the container wall.

In the examples above, the baby bottle device has two valves. One is in the teat and one communicates with the container volume outside the teat volume. However, the teat does not need its own valve, since it is in any case rendered ineffective by the added valve unit. The advantage of the teat having its own valve is that the teat may be used with the container without the partitioning element 300 and hence without the valve unit defined by the partitioning element. It also means that a standard teat (with integrated valve) may be used with the partitioning element.

The invention also provides an implementation in which the teat does not have its own valve. Such a teat could not be used without the valve unit, since there would then be no venting of the container volume.

The invention also provides a teat coupling device which implements the valve unit, for example in the form of the partitioning element 300 and optionally also the adapter element 130.

The invention may thus be applied to baby bottles which are sold having a valve in the teat which functions to allow air into the bottle when liquid/milk leaves via the teat opening. The teat coupling device is an add-on device which can be bought separately and inserted into the existing line of baby bottles to add a second function. The function of the teat coupling device is to keep the teat volume filled with liquid only with no bubbles.

The add-on separates the teat-volume from the main bottle-volume. Since the original air valve of a standard teat is located within the teat volume, which however now needs to remain filled, this valve no longer should let air come in so that the valve unit of the teat coupling device can function.

Because the valve unit is located closer to the air volume in the bottle than the original teat valve, bubbling will be mostly non-existing or at least much less depending on the orientation of the bottle.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A baby bottle device comprising a container having a container volume to contain milk;

a teat for attachment to the container and having a teat volume and at least one first valve for allowing air to flow from outside of the teat into the teat volume; and a valve unit arranged outside the teat volume for allowing air to flow into the container volume without coming into contact with milk inside the teat volume, wherein the valve unit comprises a second valve, which has a lower cracking pressure than the first valve.

2. The device according to claim 1, further comprising:

an adapter for coupling the teat to the container, wherein the valve unit is arranged in the region of a adapter.

3. The device according to claim 2, wherein the adapter is an attachment ring, wherein the adapter comprises a thread configured to interact with a thread of the container for fastening the teat to the container.

4. The device according to claim 1, further comprising:

a partitioning element between the teat volume and the container volume, wherein the partitioning element comprises at least one opening for letting fluid in the container volume flow into the teat volume.

5. The device according to claim 4, wherein the valve unit is part of the partitioning element.

6. The device according to claim 4, wherein the valve unit comprises an arm having a first end fixedly attached to the partitioning element and a second end configured to lie against a wall of the container to enable outside air to enter into the container.

7. The device according to claim 4, wherein the valve unit is attached to the partitioning element and comprises an arm which is for bearing against the wall of the container.

8. The device according to claim 4, wherein the valve unit comprises a duckbill valve, which is arranged in the partitioning element.

9. A teat coupling device for a baby bottle device, the baby bottle device comprising a container having a container volume to contain milk, and a teat for attachment to the container, the teat having a teat volume and a first valve for allowing air to flow from outside of the teat into the teat volume, the teat coupling device comprising:

a valve unit arranged outside the teat volume for allowing air to flow into the container volume without coming into contact with milk inside the teat volume, wherein the valve unit comprises a second valve having a second cracking pressure tht is lower than a first cracking pressure of the first valve.

10. A teat assembly comprising:

the teat coupling device according to claim 9; and the teat.

11. The teat coupling device according to claim 9, further comprising:

an adapter configured to couple the teat and the container.

12. The teat coupling device according to claim 11, wherein the valve unit is arranged in a region of the adapter.

13. The teat coupling device according to claim 11, wherein the adapter is an attachment ring, wherein the adapter comprises a thread configured to interact with a thread of the container for fastening the teat to the container.

14. The teat coupling device according to claim 3, further comprising:

a partitioning element arranged between the teat volume and the container volume, wherein the partitioning element comprises at least one opening enabling fluid in the container volume to flow into the teat volume.

15. The teat coupling device according to claim14, wherein the valve unit is arranged in the partitioning element.

16. The teat coupling device according to claim 15, wherein the second of the valve unit comprises a duckbill valve.

17. The teat coupling device according to claim 14, wherein the valve unit comprises a flexible arm attached to the partitioning element at a first end and configured to press against a wall of the container at a second end, enabling outside air to enter into the container.

18. A method of producing a baby bottle device, the method comprising:

providing a container having a container volume for containing milk;

providing a teat for attachment to the container, the teat having a teat volume and at least one first valve for allowing air to flow from outside of the teat into the teat volume, and providing a valve unit arranged outside the teat volume for allowing air to flow into the container volume without coming into contact with milk inside the teat volume, wherein the valve unit comprises a second valve which has a lower cracking pressure than the first valve.

19. The method according to claim 18, further comprising:

providing an adapter for coupling the teat to the container, wherein the valve unit is arranged in a region of the adapter.

* * * * *